United States Patent
Bahners et al.

(10) Patent No.: US 11,330,062 B2
(45) Date of Patent: *May 10, 2022

(54) PROVIDING SAFETY RELATED CONTEXTUAL INFORMATION IN A PERSONAL PROTECTIVE EQUIPMENT SYSTEM

(71) Applicant: 3M INNOVATIVE PROPERTIES COMPANY, St. Paul, MN (US)

(72) Inventors: Michael Bahners, Neuss (DE); Robert Bialluch, Willich (DE); Nadine E. Brueckmann, Düsseldorf (DE); Frank T. Herfort, Korschenbroich (DE); Kiran S. Kanukurthy, Cottage Grove, MN (US); Markus Gunther Wilfried Lierse, Moenchengladbach (DE)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/302,236

(22) Filed: Apr. 28, 2021

(65) Prior Publication Data

US 2021/0250407 A1  Aug. 12, 2021

Related U.S. Application Data

(63) Continuation of application No. 15/756,881, filed as application No. PCT/US2016/049236 on Aug. 29, 2016, now Pat. No. 11,025,725.

(Continued)

(51) Int. Cl.
*H04L 67/125* (2022.01)
*G06F 3/0484* (2022.01)
(Continued)

(52) U.S. Cl.
CPC .......... *H04L 67/125* (2013.01); *G06F 3/0484* (2013.01); *H04B 17/318* (2015.01);
(Continued)

(58) Field of Classification Search
CPC ....... H04L 67/125; H04L 67/34; H04L 67/18; H04L 67/12; H04L 41/22; H04B 17/318;
(Continued)

(56) References Cited

U.S. PATENT DOCUMENTS

| 917,738 A | 4/1909 | Opsal |
| 2,264,746 A | 12/1941 | Ellwood |

(Continued)

FOREIGN PATENT DOCUMENTS

| AU | 2013207606 | 2/2015 |
| CN | 201379112 | 1/2010 |

(Continued)

OTHER PUBLICATIONS

"DBI Sala—User Instruction Manual—Self Retracting Lifeline", 2007, 40 pages.

(Continued)

*Primary Examiner* — John T Repsher, III
(74) *Attorney, Agent, or Firm* — Steven A. Bern

(57) ABSTRACT

A personal protection equipment (PPE) system with a remote user interface comprises an article of PPE including an active wireless communication device for transmitting a signal and a controller for managing settings on the article of PPE; and a communication hub including a user interface, an electronic connection to a PPE management software, and a wireless communication device. When the wireless communication device of the communication hub detects that the article of PPE is in proximity to the communication hub, the hub displays information on the user interface. The user interface displays settings for the article of PPE, and the (Continued)

settings can be adjusted by a user through interaction with the user interface. The wireless communication device of the communication hub transmits information related to the adjusted settings to the wireless communication device of the article of PPE; and the controller adjusts the settings on the article of PPE.

20 Claims, 4 Drawing Sheets

Related U.S. Application Data

(60) Provisional application No. 62/212,867, filed on Sep. 1, 2015.

(51) Int. Cl.
| | | |
|---|---|---|
| *H04B 17/318* | (2015.01) | |
| *H04L 41/22* | (2022.01) | |
| *H04W 4/02* | (2018.01) | |
| *H04W 4/80* | (2018.01) | |
| *H04L 67/00* | (2022.01) | |
| *H04L 67/52* | (2022.01) | |
| *H04L 67/12* | (2022.01) | |
| *H04W 4/50* | (2018.01) | |
| *H04B 17/23* | (2015.01) | |

(52) U.S. Cl.
CPC .............. *H04L 41/22* (2013.01); *H04L 67/12* (2013.01); *H04L 67/18* (2013.01); *H04L 67/34* (2013.01); *H04W 4/02* (2013.01); *H04B 17/23* (2015.01); *H04W 4/50* (2018.02); *H04W 4/80* (2018.02)

(58) Field of Classification Search
CPC .......... H04B 17/23; H04W 4/02; H04W 4/50; H04W 4/80; G06F 3/0484; G06F 9/526; G06F 9/44
See application file for complete search history.

(56) References Cited

U.S. PATENT DOCUMENTS

| | | |
|---|---|---|
| 2,497,632 A | 2/1950 | Shacht |
| 3,473,199 A | 10/1969 | Rohland |
| 3,474,559 A | 10/1969 | Hunt |
| 3,636,594 A | 1/1972 | Faivre |
| 3,751,835 A | 8/1973 | Smith |
| 4,139,956 A | 2/1979 | Sharrow |
| 4,242,777 A | 1/1981 | Bourard |
| 4,512,096 A | 4/1985 | Heidecker |
| 4,553,633 A | 11/1985 | Armstrong |
| 4,612,719 A | 9/1986 | De Jong |
| 5,499,624 A | 3/1996 | Kruger |
| 5,584,133 A | 12/1996 | Motooka |
| 5,758,443 A | 6/1998 | Pedrazzini |
| 5,832,761 A | 11/1998 | Chen |
| 5,844,244 A | 12/1998 | Graf |
| 5,914,913 A | 6/1999 | Shriqui |
| 5,973,559 A | 10/1999 | Alberty |
| 6,144,301 A | 11/2000 | Frieden |
| 6,239,737 B1 | 5/2001 | Black |
| 6,276,179 B1 | 8/2001 | Janssen |
| 6,314,183 B1 | 11/2001 | Pehrsson |
| 6,346,886 B1 | 2/2002 | De La Huerga |
| 6,568,354 B1 | 5/2003 | Wasserman |
| 6,666,170 B1 | 12/2003 | Hilpert |
| 6,693,543 B1 | 2/2004 | Stephenson |
| 6,747,562 B2 | 6/2004 | Giraldin |
| 6,779,731 B2 | 8/2004 | Duldhardt |
| 6,810,406 B2 | 10/2004 | Schlabach |
| 6,823,617 B2 | 11/2004 | Schweikert |
| 6,853,303 B2 | 2/2005 | Chen |
| 6,897,374 B2 | 5/2005 | Garber |
| 6,965,866 B2 | 11/2005 | Klein |
| 7,002,526 B1 | 2/2006 | Adams |
| 7,152,035 B1 | 12/2006 | Suhy, Jr. |
| 7,191,097 B1 | 3/2007 | Lee |
| 7,194,415 B2 | 3/2007 | Hamada |
| 7,263,379 B1 | 8/2007 | Parkulo |
| 7,398,097 B2 | 7/2008 | Parkulo |
| 7,464,001 B1 | 12/2008 | Adams |
| 7,487,098 B2 | 2/2009 | Takagi |
| 7,621,846 B2 | 11/2009 | Ainsworth |
| 7,633,387 B2 | 12/2009 | Carmichael |
| 7,652,571 B2 | 1/2010 | Parkulo |
| 7,654,453 B2 | 2/2010 | Mochizuzi |
| 7,764,173 B2 | 7/2010 | Yamagiwa |
| 7,768,409 B2 | 8/2010 | Parias |
| 8,245,706 B2 | 8/2012 | Namm |
| 8,285,564 B2 | 10/2012 | Perkins |
| 8,294,580 B2 | 10/2012 | Witwer |
| 8,605,693 B2 | 12/2013 | So |
| 8,706,043 B2 | 4/2014 | Glezerman |
| 8,766,798 B2 | 7/2014 | Howard |
| 8,989,880 B2 | 3/2015 | Wohl |
| 2001/0056359 A1 | 12/2001 | Abreu |
| 2002/0022969 A1 | 2/2002 | Berg |
| 2002/0026537 A1 | 2/2002 | Schlabach |
| 2002/0188593 A1 | 12/2002 | Moser |
| 2003/0158796 A1 | 8/2003 | Balent |
| 2003/0226010 A1 | 12/2003 | Arima |
| 2004/0004547 A1 | 1/2004 | Appelt |
| 2004/0100384 A1* | 5/2004 | Chen ............... G07C 9/28 340/572.1 |
| 2004/0229730 A1 | 11/2004 | Ainsworth |
| 2005/0085799 A1 | 4/2005 | Luria |
| 2005/0114154 A1 | 5/2005 | Wolkowicz |
| 2005/0155887 A1 | 7/2005 | Bazany |
| 2005/0261938 A1 | 11/2005 | Silverbrook |
| 2006/0026017 A1 | 2/2006 | Walker |
| 2006/0048998 A1 | 3/2006 | Wolner |
| 2006/0087440 A1 | 4/2006 | Klien |
| 2006/0117619 A1 | 6/2006 | Ntini |
| 2006/0119525 A1 | 6/2006 | Cohen |
| 2006/0184376 A1 | 8/2006 | Graves |
| 2006/0217995 A1 | 9/2006 | Sagnak |
| 2007/0006494 A1 | 1/2007 | Hayes |
| 2007/0021971 A1 | 1/2007 | McKinney |
| 2007/0022576 A1 | 2/2007 | Christanio |
| 2007/0067227 A1 | 3/2007 | Ikeda |
| 2007/0124155 A1 | 5/2007 | White |
| 2007/0124972 A1 | 6/2007 | Ratcliffe |
| 2007/0274206 A1 | 11/2007 | Habetha |
| 2008/0018472 A1 | 1/2008 | Dasilva |
| 2008/0021717 A1 | 1/2008 | Kaartinen |
| 2008/0021718 A1 | 1/2008 | Kaartinen |
| 2008/0021905 A1 | 1/2008 | Kaartinen |
| 2008/0021919 A1 | 1/2008 | Kaartinen |
| 2008/0106088 A1 | 5/2008 | Rohlf |
| 2008/0106398 A1 | 5/2008 | Rohlf |
| 2008/0108261 A1 | 5/2008 | Swan |
| 2009/0040014 A1 | 2/2009 | Knopf |
| 2009/0224868 A1 | 9/2009 | Liu |
| 2009/0283596 A1 | 11/2009 | Grummett |
| 2010/0045464 A1 | 2/2010 | Knopf |
| 2010/0127853 A1 | 5/2010 | Hanson |
| 2010/0280904 A1 | 11/2010 | Ahuja |
| 2011/0006894 A1 | 1/2011 | Witwer |
| 2011/0102146 A1 | 5/2011 | Giron |
| 2012/0081214 A1 | 4/2012 | Alan |
| 2012/0210498 A1 | 8/2012 | Mack |
| 2012/0282887 A1 | 11/2012 | Khoo |
| 2012/0326837 A1 | 12/2012 | Ajay |
| 2013/0104733 A1 | 5/2013 | Wood |
| 2013/0180523 A1 | 7/2013 | Huggins |
| 2013/0257622 A1 | 10/2013 | Davalos |
| 2014/0032236 A1 | 1/2014 | Williams |
| 2014/0105412 A1 | 4/2014 | Alves et al. |
| 2015/0031322 A1 | 1/2015 | Twina |
| 2015/0093990 A1 | 4/2015 | Lin |

(56) References Cited

U.S. PATENT DOCUMENTS

| | | | |
|---|---|---|---|
| 2015/0105035 A1 | 4/2015 | De Oliveira | |
| 2015/0135389 A1 | 5/2015 | Yang | |
| 2015/0156567 A1 | 6/2015 | Oliver | |
| 2016/0155279 A1 | 6/2016 | Thomas | |
| 2016/0165037 A1 | 6/2016 | Youn | |
| 2016/0193084 A1* | 7/2016 | Jenkins | G10K 11/17823 |
| | | | 381/72 |
| 2016/0232758 A1* | 8/2016 | Fletcher | G08B 21/0247 |
| 2017/0189727 A1 | 7/2017 | Hunter | |
| 2017/0330444 A1 | 11/2017 | Gowrishankar | |
| 2018/0276598 A1* | 9/2018 | Y | A41D 1/002 |

FOREIGN PATENT DOCUMENTS

| | | |
|---|---|---|
| CN | 101873586 | 10/2010 |
| CN | 201630311 | 11/2010 |
| CN | 202003492 | 10/2011 |
| CN | 102256376 | 11/2011 |
| CN | 102525008 | 7/2012 |
| CN | 202472892 | 10/2012 |
| CN | 203182109 | 9/2013 |
| CN | 103478963 | 1/2014 |
| CN | 104410967 | 3/2014 |
| CN | 103823230 | 5/2014 |
| CN | 203934724 | 11/2014 |
| CN | 104353197 | 2/2015 |
| CN | 104353198 | 2/2015 |
| CN | 204169132 | 2/2015 |
| CN | 204380028 | 6/2015 |
| DE | 3611625 | 10/1987 |
| DE | 3932066 | 11/1990 |
| DE | 19816396 | 11/1998 |
| EP | 0692774 | 1/1996 |
| EP | 2388755 | 11/2011 |
| FR | 2593219 | 7/1987 |
| FR | 2704604 | 11/1994 |
| GB | 2398454 | 8/2004 |
| JP | 2004259117 | 9/2004 |
| JP | 2004343834 | 12/2004 |
| JP | 2007072802 | 3/2005 |
| JP | 2008048978 | 3/2008 |
| JP | 2008-146301 | 6/2008 |
| JP | 2014153876 | 8/2014 |
| KR | 20000071948 | 12/2000 |
| KR | 10-1050708 | 7/2011 |
| KR | 101176106 | 9/2011 |
| RU | 52377 | 3/2006 |
| TW | 200500021 | 1/2005 |
| TW | M358547 | 6/2009 |
| TW | M384556 | 7/2010 |
| WO | WO 1997-16963 | 5/1997 |
| WO | WO 1998-35243 | 8/1998 |
| WO | WO 1999-19851 | 4/1999 |
| WO | WO 2002-085106 | 10/2002 |
| WO | WO 2006-123134 | 11/2006 |
| WO | WO 2011-132933 | 10/2011 |
| WO | WO 2013-063350 | 5/2013 |
| WO | WO 2014-167144 | 10/2014 |
| WO | WO 2014-191983 | 12/2014 |
| WO | WO 2015-062693 | 5/2015 |
| WO | WO 2017-040397 | 3/2017 |

OTHER PUBLICATIONS

"Low Frequency RFID Evaluation Kit—Reference Guide", Texas Instruments, Sep. 2002, 4 pages.
"PDAge—Pocket Jobsite Inspector", 2002, 1 page.
"'Brand'—Imperial College London Learns the benefit if Safetrak", Jun. 2006, 1 page.
"Beal Services", Notice of Use—Beal Software, 2001, 18 pages.
"Electronic ID", Allflex USA. Inc., (retrieved from the internet on Jun. 3, 2006), URL: <http://www.allflexusa.com/eid/eid.php>, Jun. 2006, 6 pages.
"HandiGrimpe—Traceability Tools", BEAL, (retrieved from the internet on May 24, 2007), URL: <http://www.bealplanet.com/portail-2006/img/RFID_UNIVERSAL-gf.jpg>, Jun. 2006, 6 pages.
"Harnesses", Safetrack, (retrieved from the internet on Jun. 27, 2007), URL: <http://www.safetrack.com/Products/ApplicationsModules/Harnes/tabid/154/Defaults.aspx>, 2005, 4 pages.
"Harnesses", Safetrak, 1 page.
"HDX High Performance Ultra EID Tag—ISO Compliant", Allflex, URL <http://www.allflexusa.com>, 2006, 2 pages.
"HOA Inspector", Reef Point Technology, (retrieved from the internet on May 2, 2018), URL: <http://www.reefpt.com>, Jun. 2006, 9 pages.
"ITW Fastex—2-Piece Assembly Ratchet Rivets", ITW Fastex, (retrieved from the internet on May 7, 2018), URL: <http://www.itwfastex.eom/catalog/index.php/dw/op/a/6/c/14/p/26?m=no#spec>, Jun. 2006, 2 pages.
"Microtags Makes Harnesses Safer", Scafftag Press Release, Jun. 2002, 1 page.
"Pervidi", Techs4Biz Corporation, 2005, 11 pages.
"SAFETRAK", Scafftag Safety Systems, (retrieved from the internet on May 24, 2007) URL: <http://www.scafftag.com/productsUS.asp?Index=11>, 2005, 7 Pages.
"Scafftag Limited—The Past, Present and Future", Scafftag Press Release, Jun. 2002, 1 page.
"Tags", Safetrack, (retrieved from the internet on Jun. 27, 2007), URL: <http://www.safetrack.com/Prducts/TagsRFID/ALLTAGS/tabids/153/Defaults.aspx>, 2006, 3 pages.
"The Tracker", French Creek production, URL: <http://frenchcreekproduction.com/tracker.htm>, 2002, 2 pages.
"Tool Hound", (retrieved from the internet on May 2, 2018), URL: <http://www.toolhound.com>, 8 pages.
"UNITAG", Scafftag Safety Systems, (retrieved from the internet on May 24, 2007) URL: <http://scafftag.com/productsUS.asp?Index=10>, 2005, 5 Pages.
Kitamura, "Using Ubiquitous Networks to Create New Services Based on the Commercial and Public Infrastructure", Nomura Research Institute Paper, Sep. 1, 2002, No. 54, 14 pages.
Schott, "Applicative Characteristics of New Microelectronic Sensors Smart Retainer® and TheraMon® for Measuring Wear Time", Journal of Orofacial Orthopedics, 2010, vol. 71, No. 5, pp. 339-347.
Stuart, "Museums 2.0—How iBeacons will revolutionise museum and cultural spaces", (retrieved from the internet on May 7, 2018), URL: <http://preloaded.com/museums-20-how-ibeacons-will-revolutionise-museum-and-cultural-spaces/>, Feb. 11, 2014, 5 pages.
Zgraggen, "Tool Loss: Seeing Red???", Construction Business Owner, Mar. 2006, pp. 10-14.
International Search Report for PCT International Application No. PCT/US2016/049236, dated Nov. 17, 2016, 5 pages.

* cited by examiner

PROVIDING SAFETY RELATED CONTEXTUAL INFORMATION IN A PERSONAL PROTECTIVE EQUIPMENT SYSTEM

CROSS REFERENCE TO RELATED APPLICATIONS

This application is a continuation of U.S. application Ser. No. 15/756,881, filed Mar. 1, 2018, which claims the benefit of national stage filing under 35 U.S.C. 371 of PCT/US2016/049236, filed Aug. 29, 2016, which claims the benefit of Provisional Application No. 62/212,867, filed Sep. 1, 2015, the disclosure of which is incorporated by reference in its/their entirety herein.

TECHNICAL FIELD

The present disclosure relates to a person protective equipment (PPE) system for providing safety-related contextual information. The system can provide a remote user interface for an article of PPE. The system can provide user-centered and contextual, information related to safety and other topics through the user interface.

BACKGROUND

Maintaining the safety and health of workers is a major concern across many industries. Various rules and regulations have been developed to aid in addressing this concern. Such rules provide sets of requirements to ensure proper administration of personnel health and safety procedures. To help in maintaining worker safety and health, some individuals may be required to don, wear, carry, or otherwise use a personal protective equipment (PPE) article, if the individuals enter or remain in work environments that have hazardous or potentially hazardous conditions.

Consistent with evolving rules and regulations related to safety, safety is an important concern in any workplace requiring the use of PPE. Companies or businesses employing workers wearing articles of PPE also want to ensure that workers are complying with relevant laws, regulations and company policies related to proper use and maintenance of PPE.

Manually monitoring the use of PPE in a given workplace can be cumbersome and time consuming for supervisors or other individuals with safety inspection or compliance roles within an organization. Improved methods and systems for monitoring safety compliance, PPE maintenance, communicating with workers about various topics and providing safety-related contextual information in a work environment requiring the use of PPE would be welcomed.

SUMMARY

The present disclosure includes a PPE system with a remote user interface, and further includes a user-centered PPE system. The systems of the present disclosure provide several advantages over the status quo. For example, they enable communicating automated and customized reminders related to safety to workers using or wearing PPE or using or wearing a user device. The present disclosure provides real time information related to PPE status and safety needs to workers using or wearing PPE or using or wearing a user device. The present disclosure allows for simple and trackable reporting of PPE status through a user interface. The present disclosure allows for tracking of safety-related data to document compliance, create reports, and assess PPE replacement or maintenance needs. The present disclosure provides a communication medium for quickly communicating information to workers, and attracting workers to view such information. Other advantages of the present disclosure will be apparent to one of skill in the art upon reading the present disclosure.

In one instance, the present disclosure includes a personal protective equipment (PPE) system with a remote user interface. The PPE system comprises an article of PPE including an active wireless communication device for transmitting a signal and a controller for managing settings on the article of PPE. The PPE system further comprises a communication hub including a user interface, an electronic connection to a PPE management software, and a wireless communication device. When the wireless communication device of the communication hub detects that the article of PPE is in proximity to the communication hub, the communication hub displays information on the user interface. The information displayed on the user interface includes settings for the article of PPE, and the settings can be adjusted by a user through interaction with the user interface. The wireless communication device of the communication hub transmits information related to the adjusted settings to the wireless communication device of the article of PPE; and the controller adjusts the settings on the article of PPE.

In some instances, the article of PPE is in proximity to the communication hub when the received signal strength indicator (RSSI) of the signal from the active wireless communication device of the piece of PPE exceeds a threshold.

In some instances, the PPE system further comprises a user device including an active wireless communication device, wherein the communication hub further detects the presence of a user by detecting that a signal transmitted by a user device exceeds a received signal strength indicator (RSSI) threshold.

In some instances, the settings for the article of PPE displayed by the user interface are customized based on a user identifier in the signal transmitted by the user device.

In some instances, the communication hub can transmit a command or other data to an article of PPE within a signal range of the communication hub.

In some instances, the settings for the article of PPE displayed by the user interface are customized based on context information received from the PPE management software or from remote sensors.

In some instances, context information includes user personal information, environmental information, location based information, safety related information, task related information, PPE information, sensor information.

In another instance, the present disclosure includes a user-centered personal protection equipment (PPE) system. The PPE system comprises a communication hub including a user interface, an electronic connection to a PPE management software, and a wireless communication device; and a user device including an active wireless communication device. The active wireless communication device of the user device transmits a signal including a user identifier. When the wireless communication device of the communication hub detects that the user device is in proximity to the communication hub, the communication hub displays information on the user interface. The information displayed on the user interface includes user-specific information received from the PPE management software and based on the user identifier. The user interface provides the user the option to enter information related to a piece of PPE through interaction with the user interface.

In some instances, the information includes a unique message for the user.

In some instances, the information includes unique user health or safety data.

In some instances, the user interface provides an option for the user to provide performance feedback related to the piece of PPE through interaction with the user interface.

In some instances, the information includes information related to a game the user is participating in.

In some instances, the user interface allows the user to select attractive information to display on the user interface.

In some instances, the piece of PPE comprises an active wireless communication device.

In some instances, the information includes unique user productivity information.

In some instances, the user interface provides an option for the user to acknowledge a message by interacting with the user interface.

In some instances, the information includes unique user task information.

In some instances, the user is in proximity to the communication hub when the received signal strength indicator (RSSI) of the signal from the active wireless communication device of the user device exceeds a threshold.

In some instances, the communication hub can transmit a command to a user device in a signal range of the communication hub.

In some instances, the information includes context information received from the PPE management software or remote sensors.

In some instances, context information includes user personal information, environmental information, location based information, safety related information, task related information, PPE information, sensor information.

BRIEF DESCRIPTION OF DRAWINGS

The following figures provide illustrations of the present invention. They are intended to further describe and clarify the invention, but not to limit scope of the invention.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
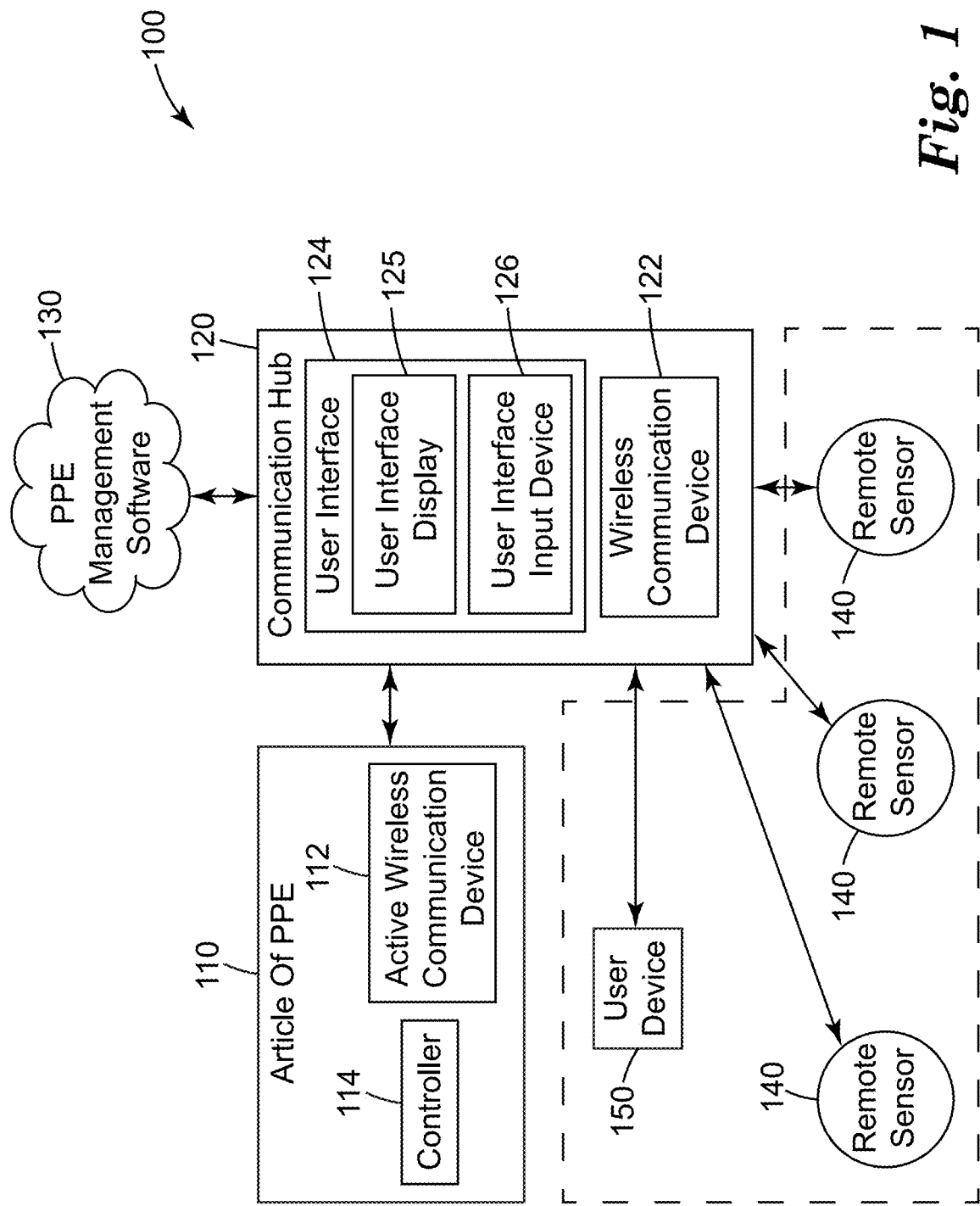
FIG. 1 is a system diagram of an exemplary PPE system providing a remote user interface for an article of PPE.

FIG. 1 is a system diagram of an exemplary PPE system 100 providing a remote user interface for an article of PPE 110. Many different types of PPE may be used in the context of the present system. For example, article of PPE 110 may be, without limitation, respiratory protection equipment (RPE), e.g., for normal condition use or emergency response; protective eyewear, such as visors, goggles, filters or shields; protective headwear, such as hard hats, hoods or helmets; hearing protection devices; protective shoes; protective gloves; other protective clothing, such as coveralls and aprons; protective articles, such as sensors, safety tools, detectors, global positioning devices, mining cap lamps and any other suitable gear.

Article of PPE 110 includes active wireless communication device 112 for transmitting a signal. The signal transmitted by active wireless communication device 112 may include a unique identifier that can be associated with article of PPE 110 in PPE management software 130. A unique identifier, may be, for example, a serial number stored in the active wireless communication device 112 or another number written to the memory of the active wireless communication device 112. The signal transmitted by active wireless communication device 112 may include other information, such as the length of time the article of PPE 110 has been in use, battery status, user settings, set-up or setting information based on contextual or environmental information. Active wireless communication device 112 may receive information from remote sensors 140 and relay the information received from remote sensors 140 to communication hub 120. Active wireless communication device 110 may be any device capable of communicating wirelessly with another communication device and having a power source separate from the other communication device. For example, active wireless communication device 110 may be a radio frequency identification (RFID) tag with a power source, a zigbee radio, a bluetooth transmitter, such as a Bluetooth beacon, and a WiFi device, ANT node for communication in an ANT network or any other communication device as will be apparent to one of skill in the art upon reading the present disclosure. In some instances, active wireless communication device 110 may transmit a signal without first receiving a signal from another communication device. In some instances, active wireless communication device 110 may continuously transmit a signal. In some instances, active wireless communication device 110 may continuously transmit a signal whenever the article of PPE is powered or in an "ON" state. In some instances, active wireless communication device 110 may share a power source with other electronic components of the article of PPE 110.

Article of PPE 110 also includes, in some instances, controller 114. Controller 114 manages settings on the article of PPE. Controller 114 can be any processor that controls or manages functions, capabilities, settings or processes performed by article of PPE 110. For example, in some instances article of PPE 110 may have an "ON" or "OFF" switch. Controller 114 may receive a signal from the "ON" or "OFF" switch to enable or disable power to certain components on the PPE, and in turn, controller 114 transmits the correct signal to the components that controller 114 controls. An example of such a component is a fan that is part of a respiratory device, such as a powered air purifying respirator (PAPR). Controller 114 may further control or manage settings or configurations for a particular device. For example, a hearing protector may be tuned to filter out or amplifier sound transmitted at particular frequencies or in particular frequency ranges. Controller 114 may be able to manage or adjust the selected frequencies or frequency ranges in response to a command from a user, through a remote user interface as described herein.

PPE System 100 further includes a communication hub 120. Communication hub includes a user interface 124, an electronic connection to a PPE management software 130, and a wireless communication device 122. The electronic connection to a PPE management software could be any configuration as will be apparent to one of skill upon reading the present disclosure. For example, communication hub 120 may have a locally installed instance of the PPE management software 130. In another instance, communication hub 120 may have a local application that interfaces with PPE management software 130 through an internet connection, an ethernet connection or another wired or wireless electronic connection. PPE management software 130 may be a cloud hosted software or may be hosted on a local or remote database. Other configurations for an electronic connection with PPE management software 130 will be apparent to one of skill in the art upon reading the present disclosure. In some instances, communication hub 120 may communicate with article of PPE 110, user device 150 or remote sensors 140 through a first mode of communication, such as a Bluetooth connection, and communicate with PPE management software 130 through a second mode of communication, such as a wireless RF connection. Communication hub 120 may be, for example, a computing device with a touch screen. In this instance, user interface 124 is the touch screen and includes both user interface display 125 and user interface input device 126. User interface input device 126 can be either a button, mouse, key pad, key board or any other input mechanisms including mechanical, electrical or other sensor functions. User interface input device 126 may be integrally combined with or separate from user display 125. User interface input device 126 may alternatively or may also be a the touch functionality of a touch screen, such that a touch screen serves both as user interface display 125 and user interface input device 126. Other examples of devices that can serve as user interface 124 will be apparent to one of skill in the art upon reading the present disclosure.

Wireless communication device 122 of communication hub 120 can be any device capable of communicating wirelessly with another communication device. Wireless communication device 122 may be a radio frequency identification (RFID) tag, with or without a power source, a zigbee radio, a bluetooth transmitter, such as a Bluetooth beacon, and a WiFi device or any other communication device as will be apparent to one of skill in the art upon reading the present disclosure. In some instances, wireless device 122 may transmit a signal without first receiving a signal from another communication device. In some instances, wireless communication device 122 may continuously transmit a signal. In some instances, wireless communication device 122 may not transmit a signal until it has first received a signal from another communication device. In some instances, wireless communication device 122 may share a power source with other electronic components of communication hub 120.

In some instances, when wireless communication device 122 of the communication hub 120 detects that article of PPE 110 is in proximity to the communication hub 120, the communication hub 120 displays information on the user interface display 125. User interface display 125 can display any type of information as will be apparent to one of skill in the art upon reading the present disclosure. In some instances, displaying information on the user interface display 125 includes providing power to or otherwise activing user interface display 125 such that it displays a graphical user interface to a user. In some instances, the article of PPE 110 is in proximity to the communication hub 120 when the received signal strength indicator (RSSI) of the signal from the active wireless communication device 112 of the piece of PPE exceeds a threshold. In some instances, the article of PPE 110 is in proximity to the communication hub 120 when the RSSI is less than a threshold. RSSI is a measure of power present in a received radio or other type of signal. A signal transmitted by a device is more dissipated and has less power the further the distance from the device transmitting the signal. Similarly, the higher the RSSI number, the stronger the signal, and the nearer a receiver is to the device transmitting the received signal. To determine whether an article of PPE 110 is in proximity of communication hub 120, the wireless communication device 122 or a processor in communication with wireless communication device 122 can determine the RSSI of a received signal that has been transmitted by the active wireless communication device 112 of the article of PPE 110. If the RSSI meets or exceeds a threshold, the article of PPE is determined to be in proximity of the communication hub 120. In some instances, RSSI may be a negative number, such as when the RSSI is measured in dBm. RSSI may be measured in any manner consistent with the type of signal to which it is being applied.

The threshold may be predetermined such that it is set in advance by a manufacturer of the system, or is set and/or adjusted by a distributor, installer or user of the system. The threshold may be any desired number based on the desired effect. For example, the threshold may be set so as to determine only that PPE within a short distance, such as about a meter, or an arm's reach of the communication hub 120 are in proximity of the communication hub 120. This can help avoid inadvertent determinations of proximity due to users of an article of PPE 110 merely walking past communication hub 120. In some instances, the threshold may be set as near to zero as practically possible such that if a signal transmitted by the active wireless communication device 112 of the article of PPE 110 is received by wireless communication device 122, the article of PPE 110 is considered to be in proximity of communication hub 120. An article of PPE 110 is in range of the communication hub 120 if a signal transmitted by the active wireless communication device 112 of the article of PPE 110 is received by wireless communication device 122.

When communication hub 120 detects that an article of PPE 110 is in proximity of the communication hub 120, in some instances, the user interface 124 displays settings for the article of PPE 110. In some instances, the displayed settings can be adjusted by a user through interaction with the user interface 124, and in some instances more specifically, through interaction with the user interface input device 126. Wireless communication device 122 of the communication hub transmits information related to the adjusted settings to the active wireless communication device 112 of the article of PPE 110. The controller 114 adjusts the settings on the article of PPE 110 to implement the adjustments made by the user through interaction with the user interface 124.

In some instances, the communication hub 120 can transmit a command or other data to an article of PPE 110, or multiple articles of PPE, within a signal range of the communication hub 120. Communication hub 120 may transmit alarms, announcements, environmental status, required PPE information, time information, environmental information, and automatically change settings on articles of PPE in range of communication hub 120.

PPE system 100 may further optionally include user device 150 and remote sensor 140. User device 150 may be uniquely assigned to a user and may include an active wireless communication device. An active wireless communication device of the user device 150 may transmit a signal including at least a unique user identifier. The user identifier may be associated with or assigned to the user and this information may be stored in the PPE management software 130. In some instances, the communication hub 120 further detects the presence of a user by detecting that a signal transmitted by a user device 150 exceeds a received signal strength indicator (RSSI) threshold. In some cases, the settings for the article of PPE 110 displayed by the user interface 124 are customized based on a user identifier in the signal transmitted by the user device.

Remote sensors 140 can be any type of sensor that detects or transmits environmental, location, or safety information. Examples of remote sensors 140 include temperature, humidity, chemical/hazardous exposure, radiation, noise, and location. Information transmitted by a sensor could be programmed onto a remote sensor 140 or may be detected by a sensor 140. Remote sensors 140 may include a sensing or detecting component and a communication component. Remote sensors 140 can be located in range of the communication hub 120, or can be in communication with communication hub 120 through a shared network. In some instances, remote sensors 140 may be affixed to a structure or a stationary element of an environment. In some instances, remote sensors 140 could be worn by users, affixed to mobile items, such as carts, ladders, equipment or articles of PPE. For example remote sensors 140 may communicate with a network or may communicate directly with communication hub 120 in a variety of ways. For example, remote sensors 140 may transmit information to or receive information from communication hub 120 or a network on a regular interval. In some instances, remote sensors 140 may transmit information in response to a query. In some instances remote sensors 140 may transmit information in response to detecting another communication device, such as user device 150 in range of the remote sensors 140.

In some instances, the settings for the article of PPE 110 displayed by the user interface 124 are customized based on context information received from the PPE management software 130 or from remote sensors 140. Context information includes user personal information, environmental information, location based information, safety related information, task related information, PPE information, and sensor information.

Figure 2:
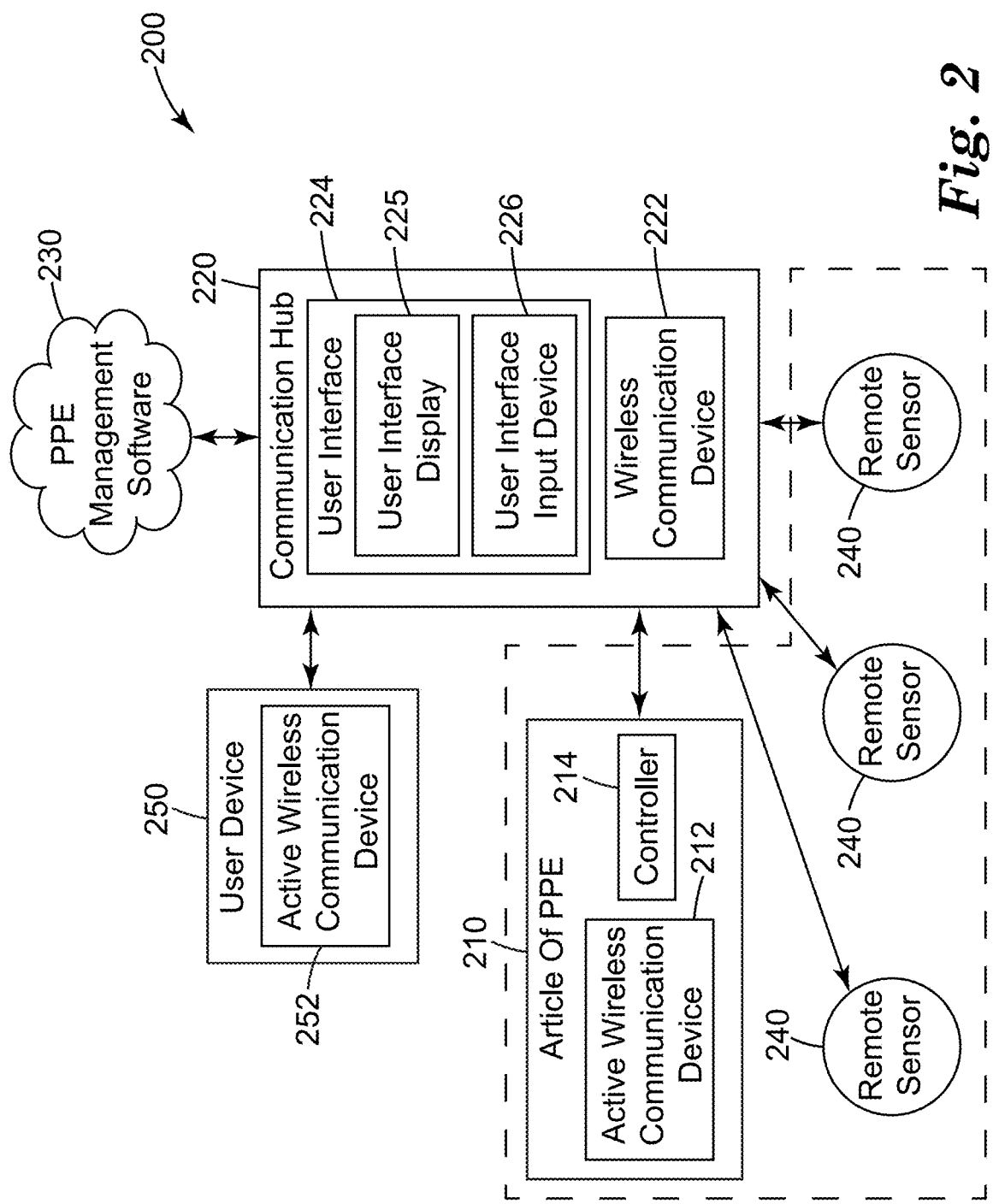
FIG. 2 is a system diagram of an exemplary user-centered PPE system.

FIG. 2 is a system diagram of an exemplary user-centered PPE system 200. User-centered PPE system 200 has many similar components to PPE system 100, including communication hub 220 (with user interface 224, user interface display 225 and user interface input device 226) and PPE management software 230. User-centered PPE system 200 includes user device 250 and optionally includes article of PPE 210 and remote sensors 240. Each of these components may have at least the same features and functionality as described with respect to parallel components throughout this disclosure.

User centered PPE system 200 includes communication hub 220 including a user interface 224, an electronic connection to a PPE management software 230 and a wireless communication device 222. User centered PPE system 200 further includes user device 250 with active wireless communication device 252. Active wireless communication device 252 of the user device 250 transmits a signal including a user identifier. Active wireless communication device 252 could be, for example, a Bluetooth tag or beacon, a node for communication with an ANT network, or any other type of active wireless communication device. User device 250 could be worn by user in a variety of ways. For example, user device 250 may be worn on a cord or lanyard around a user's neck, may be on a fob or dongle, or may be attached to an article of clothing. When the wireless communication device 222 of communication hub 220 detects that the user device 250 is in proximity to the communication hub 220, the communication hub 220 displays information on the user interface 224. Such display may be on the user interface display 225. User interface 224 displays user-specific information received from the PPE management software 230 and based on the user identifier. Examples include PPE currently used or checked out by user (list of PPE, replacement, maintenance, etc.), training status, messages, calendar of upcoming events, task list, or attractive information such as news, sports, weather, or train times. A user can choose what time of day they wish to receive which type information. User interface 224 provides the user the option to enter information related to a piece of PPE through interaction with the user interface 224. Specifically, the user may enter information through the user interface input device 226. Such information related to the piece of PPE may include, for example, what article of PPE the user is currently checking out or checking in, whether an article of PPE has been damaged, performance feedback related to the piece of PPE. Such information may further include indicating that the user has exchanged an article of PPE, inputting information for maintenance, cleaning, or providing user experience feedback In some instances, the user interface displays a unique message for the user. For example, a unique message may be a message entered into the PPE management software 230 by the user's supervisor and associated with the user's unique identifier in the PPE management software 230. The unique message may be automatically generated by the PPE management software based on information on training, calendar based, or an area-specific alert.

In some instances, the user interface 224 displays unique user health or safety data associated with the user's unique identifier. For example, safety data may include whether the user has completed all required training for using a particular article of PPE. Health data may include any known health problems the user may have (such as weight lifting restriction or chemical sensitization). Health data may include information indicating whether the user has completed all required health checks. Health data and any other information displayed by user interface 224 can be customized based on local privacy laws, rules or regulations.

In some instances, user interface 224 displays information related to a game the user is participating in. A game may include, for example, a contest against other users related to achieving high safety ratings or high user productivity. Games may include the opportunity to earn incentives, to count activities performed and may be team-based.

In some instances, the user interface 224 may display attractive information. Attractive information is information that is relevant to a user but not work-related. Examples of attractive include weather conditions, current news, sports information, a cafeteria menu, facility announcements, maps, menus for local restaurants. In some instances, a user may select what attractive information the user interface display 225 will show using the user interface 224 or the user interface input device 226.

In some instances, the article of PPE that the user may enter information relating to includes an active wireless communication device. In particular, high value PPE may be more likely to include an active wireless communication device. This can provide better tracking, inventory control and maintenance records related to higher value PPE. In some instances, the article of PPE may not include an active wireless communication device. In these instances, the article of PPE may be lower value or may not be reusable, may be one-time use, or may simply have no powered components aside.

The user interface 224 may perform a variety of other functions, such as displaying unique user productivity information, displaying unique user task information and providing an option for the user to acknowledge a message by interacting with the user interface, for example, by providing input through the user interface input device 226.

In some instances, the user interface 224 displays context information received from the PPE management software 230 or remote sensors 240. Context information includes user personal information, environmental information, location based information, safety related information, task related information, PPE information, and sensor information.

In some instances, the communication hub 220 can transmit a command, data or other information to a user device or an article of PPE in a signal range or in range of the communication hub.

Figure 3:
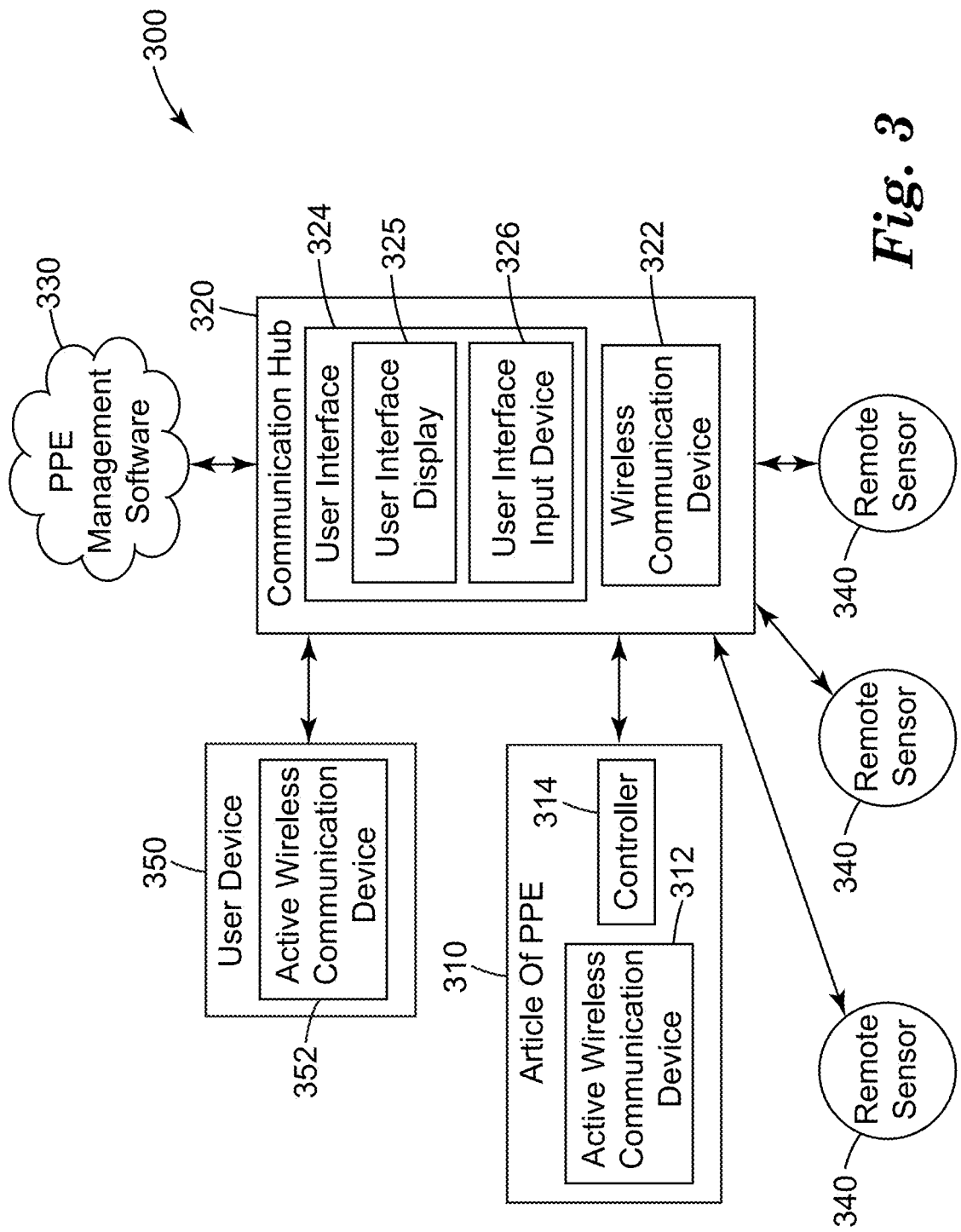
FIG. 3 is a system diagram of an exemplary user-centered PPE system providing a remote interface for an article of PPE.

FIG. 3 is a system diagram of an exemplary user-centered PPE system providing a remote interface for an article of PPE. PPE system 300 has many similar components to PPE system 100 and user-centered PPE system 200, including communication hub 320 (with user interface 324, user interface display 325 and user interface input device 326) and PPE management software 330. PPE system 300 also includes user device 350, article of PPE 310 and remote sensors 340. Each of these components has at least the same features and functionality as similar components described throughout this disclosure.

Figure 4:
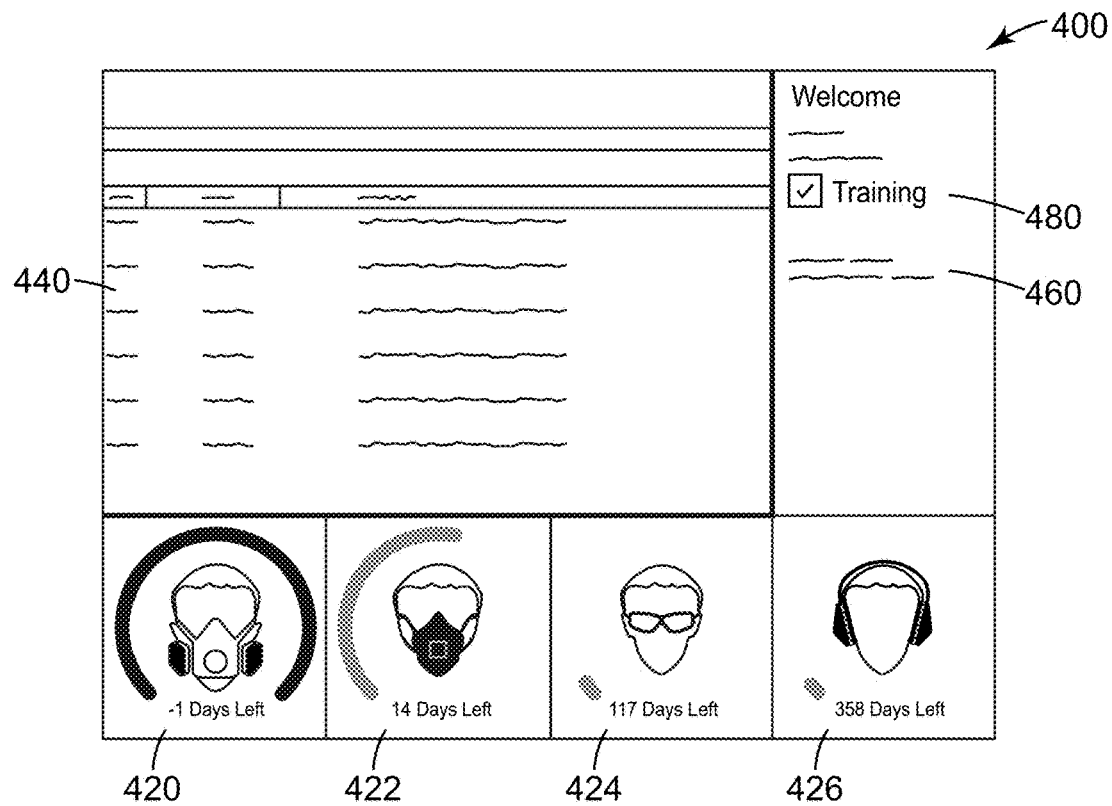
FIG. 4 is an exemplary user interface for use in a PPE system.
Figure 5:
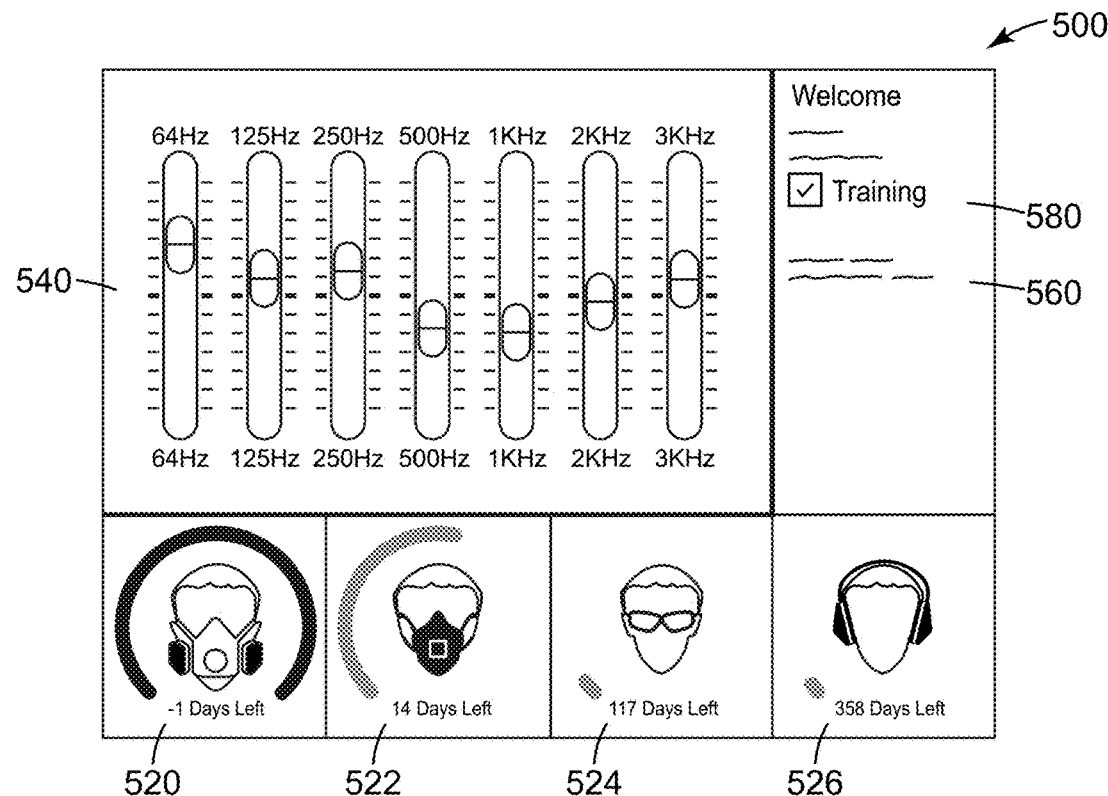
FIG. 5 is a second exemplary user interface for use in a PPE system.

FIG. 4 is an exemplary user interface 400 for use in a PPE system. User interface 400 can contain a variety of information, and the examples shown in both FIGS. 4 and 5 are exemplary and non-limiting. User interface 400 in FIG. 4 is displayed on a touch screen such that a user can select any of the areas immediately displayed and access additional information. Sections 420, 422, 424 and 426 each show information related to various articles of PPE associated with a user in the PPE management software. For example, section 420 shows that one respirator associated with the user is one day beyond its required service date. Section 422 shows that a second respirator associated with the user has only fourteen (14) days until maintenance or replacement is required. Section 424 shows that protective eye wear associated with the user has 117 days until maintenance or replacement is required. Section 426 shows that protective hearing muff has 358 days until maintenance or replacement is required.

Section 440 shows a schedule. The schedule may be unique and based on the user's or worker's unique identifier, or it may be a facility or generic schedule.

Section 460 displays user information provided by the PPE management software. User information allows a user to confirm that the communication hub has correctly identified the user based on the unique identifier in the signal received from the user device. The unique identifier is used to collect the correct identification data from the PPE management software.

Section 480 displays safety information for the worker. More specifically, it indicates that the worker's training is up to date.

FIG. 5 is a second exemplary user interface for use in a PPE system. FIG. 5 shows an instance where the user interface 500 is serving as a remote user interface for an article of PPE. Specifically, sections 520, 522, 524 and 526 contain PPE information indicating the length of timing remaining until required service or maintenance of various pieces of PPE, similar to sections 420, 422, 424 and 426 in FIG. 4. Section 560 includes user information similar to section 460. Section 580 includes worker safety information similar to section 480.

Section 540 displays various settings for an article of PPE. Specifically, section 540 displays the volume for various frequencies for a protective hearing muff with active filtering. A user is able to adjust the volumes for these frequencies through interaction with the user interface 500, and the communication hub sends a signal to the article of PPE, the signal including the changed setting information. The controller in the article of PPE then adjusts the settings in the PPE according to the settings selected or adjusted through the user interface.

Many other examples of information to display, user interaction and setting modification through the user interface will be apparent to one of skill in the art upon reading the present disclosure.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

What is claimed is:

1. A system comprising:
    an article of PPE including an active wireless communication device for transmitting a signal, and a controller for managing configuration settings on the article of PPE;
    a communication hub including a user interface and a wireless communication device; and
    a user device including a second wireless communication device;
    wherein when the wireless communication device of the communication hub detects that the article of PPE is in proximity to the communication hub, the communication hub displays the configuration settings on the user interface;
    wherein the configuration settings can be adjusted by a user through interaction with the user interface;
    wherein the wireless communication device of the communication hub transmits information related to adjusted configuration settings input by the user through interaction with the user interface to the wireless communication device of the article of PPE;
    wherein the controller adjusts the configuration settings on the article of PPE in response to receipt of the information related to the adjusted configuration settings; and
    wherein the configuration settings on the article of PPE displayed on the user interface are customized based on a user identifier in a signal transmitted by the user device.

2. The system of claim 1, wherein the article of PPE is in proximity to the communication hub when a received signal strength indicator (RSSI) of the signal from the active wireless communication device of the article of PPE exceeds a threshold.

3. The system of claim 1, wherein the communication hub further detects the presence of a user by detecting that a signal transmitted by a user device exceeds a received signal strength indicator (RSSI) threshold.

4. The system of claim 1, wherein the communication hub can transmit a command or other data to an article of PPE within a signal range of the communication hub.

5. The system of claim 1, wherein the configuration settings displayed on the user interface are customized based on context information received from remote sensors.

6. The system of claim 5, wherein context information includes user personal information, environmental information, location based information, safety related information, task related information, PPE information, or sensor information.

7. A user-centered personal protection equipment (PPE) system comprising:
    a communication hub including a user interface and a wireless communication device;
    a user device including an active wireless communication device;
    wherein the active wireless communication device of the user device transmits a signal including a user identifier;
    wherein when the wireless communication device of the communication hub detects that the user device is in proximity to the communication hub, the communication hub displays information on the user interface;
    wherein the information displayed on the user interface includes user-specific information based on the user identifier;
    wherein the user interface provides a user an option to enter information related to an article of PPE having a PPE controller through interaction with the user interface;
    wherein the information displayed on the user interface includes configuration settings on the article of PPE, and wherein the configuration settings are customized based on the user identifier in the signal transmitted by the user device and can be adjusted by the user through interaction with the user interface;

wherein the wireless communication device of the communication hub transmits information related to adjusted configuration settings input by the user through interaction with the user interface to the article of PPE; and wherein the PPE controller adjusts the configuration settings on the article of PPE in response to receipt of the information related to the adjusted configuration settings.

8. The system of claim 7, wherein the information displayed on the user interface includes a unique message for the user.

9. The system of claim 7, wherein the information displayed on the user interface includes unique user health or safety data.

10. The system of claim 7, wherein the user interface provides an option for the user to provide performance feedback related to the article of PPE through interaction with the user interface.

11. The system of claim 7, wherein the information displayed on the user interface includes information related to a game the user is participating in.

12. The system of claim 7, wherein the user interface allows the user to select attractive information to display on the user interface.

13. The system of claim 7, wherein the article of PPE comprises a second active wireless communication device.

14. The system of claim 7, wherein the information displayed on the user interface includes unique user productivity information.

15. The system of claim 7, wherein the user interface provides an option for the user to acknowledge a message by interacting with the user interface.

16. The system of claim 7, wherein the information displayed on the user interface includes unique user task information.

17. The system of claim 7, wherein the user is in proximity to the communication hub when a received signal strength indicator (RSSI) of the signal from the active wireless communication device of the user device exceeds a threshold.

18. The system of claim 7, wherein the communication hub can transmit a command to a user device in a signal range of the communication hub.

19. The system of claim 1, wherein the configuration settings include personal health or safety configuration settings.

20. The system of claim 1, wherein the article of PPE is a hearing protection device and the adjusted configuration settings include volume settings for one or more frequency ranges filtered by the hearing protection device.

* * * * *